US012597536B2

(12) United States Patent
Furu et al.

(10) Patent No.: US 12,597,536 B2
(45) Date of Patent: Apr. 7, 2026

(54) SUBSEA CABLE SYSTEM AND METHOD

(71) Applicant: Siemens Energy AS, Oslo (NO)

(72) Inventors: Gaute Skjelbred Furu, Oslo (NO); Helyson Parente, Lade (NO); Christopher Plant, Lancaster (GB)

(73) Assignee: SIEMENS ENERGY AS, Oslo (NO)

( * ) Notice: Subject to any disclaimer, the term of this patent is extended or adjusted under 35 U.S.C. 154(b) by 537 days.

(21) Appl. No.: 18/150,811

(22) Filed: Jan. 6, 2023

(65) Prior Publication Data

US 2023/0223167 A1 Jul. 13, 2023

(30) Foreign Application Priority Data

Jan. 11, 2022 (GB) ...................................... 2200276

(51) Int. Cl.
*H01B 7/14* (2006.01)
*H01B 19/00* (2006.01)

(52) U.S. Cl.
CPC ............... *H01B 7/14* (2013.01); *H01B 19/00* (2013.01)

(58) Field of Classification Search
CPC ........................................................ H01B 7/14
USPC ........................................................ 174/68.1
See application file for complete search history.

(56) References Cited

U.S. PATENT DOCUMENTS

2003/0228783 A1* 12/2003 Cairns .................. G02B 6/4428 439/204
2018/0083705 A1* 3/2018 Villmark .......... H04B 10/25891
2020/0377184 A1* 12/2020 Kinsella .................... F16L 1/26

FOREIGN PATENT DOCUMENTS

| | | | |
|---|---|---|---|
| CN | 105655800 | B | 6/2018 |
| CN | 109244711 | B | 3/2020 |
| CN | 110649423 | B | 4/2020 |
| CN | 214542720 | U | 10/2021 |
| EP | 3211726 | B1 | 5/2021 |
| TW | I686026 | B | 2/2020 |
| WO | 9844372 | A1 | 10/1998 |

* cited by examiner

*Primary Examiner* — Stanley Tso

(57) ABSTRACT

A subsea cable repair system comprises a first wet mate connector part (11) and a second wet mate connector part (14). The first and second wet mate connector parts comprise a receptacle and a plug. Separate lengths of oil filled hose (12) are attached to one end of each of the first and second connector parts (11, 14) and a cable termination (13) is attached to the other end of each of the separate lengths of oil filled hose.

5 Claims, 4 Drawing Sheets

SUBSEA CABLE SYSTEM AND METHOD

This invention relates to a subsea, or underwater, cable, a system for repairing the cable and an associated method of maintaining integrity of the cable.

Subsea power grids comprise multiple elements of subsea equipment, all interconnected, typically by subsea cables which may be connected by dry mate connectors, or by wet-mate connectors, to the subsea equipment. The elements of a subsea grid may include one or more subsea transformers, subsea switchgear, subsea variable speed drives and a low voltage distribution and communication system, all interconnected by the cables and connectors. Repair and maintenance of such subsea cables, if they fail, or are damaged, can be costly. Improvements to maintain cable integrity are desired.

In accordance with a first aspect of the present invention, a subsea cable repair system comprising a first wet mate connector part and a second wet mate connector part, wherein the first and second wet mate connector parts comprise a receptacle and a plug; separate lengths of oil filled hose attached to one end of each of the first and second connector parts; and a cable termination attached to the other end of each of the lengths of oil filled hose.

The lengths of oil filled hose may be less than or equal to 60 metres, in particular, less than or equal to 10 metres.

The cable termination may comprise a pre-moulded fitting.

This allows the termination to be carried out relatively quickly, even in rough conditions topside, or where time taken for operations subsea for the dry chamber example, has a direct cost.

The cable repair system may further comprise a removable, reusable, subsea stroking tool.

The stroking tool may comprise a pair of fixing mounts, one for each connector part and an actuator, to bring the connector parts together subsea.

The actuator may comprise a hydraulic actuator, an electrical actuator, or a mechanical arm.

In accordance with a second aspect of the present invention, a method of subsea cable repair or intervention comprises determining a location of a fault or failure in a subsea cable which indicates a loss of integrity of the cable; separating the cable at the point of failure, subsea, to form first and second cable ends; retrieving the first and second cable ends to a dry location; terminating a first subsystem comprising a female wet mate connector part, an oil filled hose and a cable termination to the first cable end, via the cable termination; and terminating a second subsystem comprising a male wet mate connector, an oil filled hose and a cable termination to the second cable end, via the cable termination; returning the cable ends to the seabed; and mating the female and male wet mate connectors.

Mating the wet mate connectors restores the integrity of the subsea cable, without the need for a long contingency cable that can reach the seabed.

The cable ends may be placed in first and second fixings of a stroking tool; and, the stroking tool may be actuated to bring the female and male connector parts together. The connected cable may be removed from the stroking tool fixings and the stroking tool may be retrieved to the surface, a subsea chamber; or to another subsea cable failure point.

An example of a subsea cable system and associated method in accordance with the present invention will now be described with reference to the accompanying drawings in which:

FIGS. 1*a* and 1*b* illustrate examples of subsea grids in which the present invention may be used;

Electrical medium voltage or high voltage connections between subsea modules of a subsea power grid may comprise a cable of some weight and stiffness, as well as wet mate connectors that require careful mating. In a subsea power grid, the power grid may comprise a plurality of subsea modules, such as variable speed drives (VSD) installed at a location on the seabed and switchgear to distribute power to each drive from a transformer. Alternatively, the transformer may aggregate power from local sources, such as wind turbines and prepare to send that power to the shore, or supply that locally generated power to subsea modules. In the first case, the transformer is provided to transform power from a power source down to an operating voltage and supply power via the switchgear to the drives. Electric power may be transmitted to the subsea installation from a topside installation, e.g., via a subsea cable, for example an umbilical from an offshore platform or ship, or via a subsea cable from an onshore site, or there may be incidental local power generated subsea, suitable for low power applications. Higher voltages are often used for transmission of electric energy from a topside installation to the subsea installation, as this helps to limit losses. For some power generation offshore, e.g. from wind turbines, the voltage may need to be stepped up, so a suitable transformer is provided according to the power source.

Wet mate connectors comprise two connector parts, generally known as a plug and a receptacle. In most cases, cables for a subsea grid will have one connector part mounted at a fixed location, for example onto a subsea module, or a frame and the other connector part on a flying lead, i.e., fitted to a cable, umbilical or jumper that can be moved around underwater, e.g., by a diver or ROV. The connector part on the flying lead is wet matable, i.e. connected to the fixed connector part when both parts are already underwater, for example by the ROV or diver carrying out the mating operation. However, it may also be possible that two flying leads need to be connected together beneath the water and the coupler of the present invention would be suitable for that operation as well.

Figure 1A:
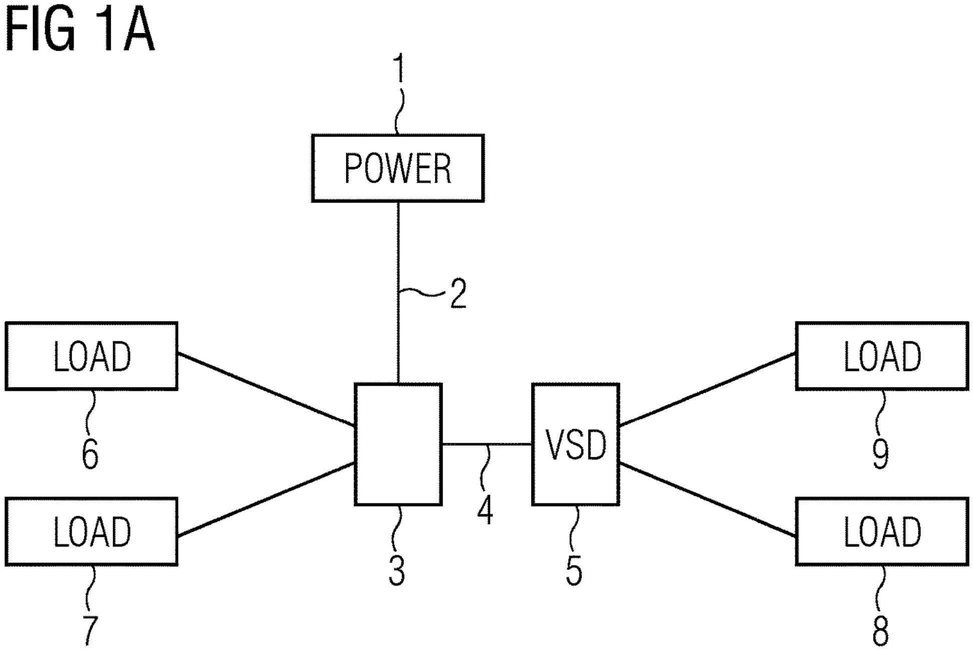

FIG. 1*a* is a block diagram of a typical subsea power grid. Power from a power source 1 may be fed via an umbilical 2 to a transformer 3. The transformer 3 is typically connected via jumpers 4 to one or more variable speed drives 5, or to loads 6, 7. The variable speed drives may also connect to loads 8, 9. The transformer 3 may be a step-down transformer if it brings power from a higher voltage than is required for operation of the VSDs 5 or loads 6 to 9, or it may be a step-up transformer if it aggregates locally generated power. In some subsea grids, both step up and step down transformers may be provided. The loads 6,7 connected to the transformer 3 and the loads 8, 9 connected to the variable speed drive may, for example be pumps, or compressors, driven by electric motors, or may be separators, or other types of load. Suitable wet mate connectors are provided to connect cables, umbilicals, or jumpers to each element of the grid. Alternatively, some of the components may be connected by dry mates before installation subsea, for example, the cables may have a dry mate connector at the transformer or VSD end and a wet mate connector to the loads. The second connector part may take the form of a protective cap that is put in place topside and removed and replaced with the functional second connector part subsea, when the wet mate is carried out.

Figure 1B:
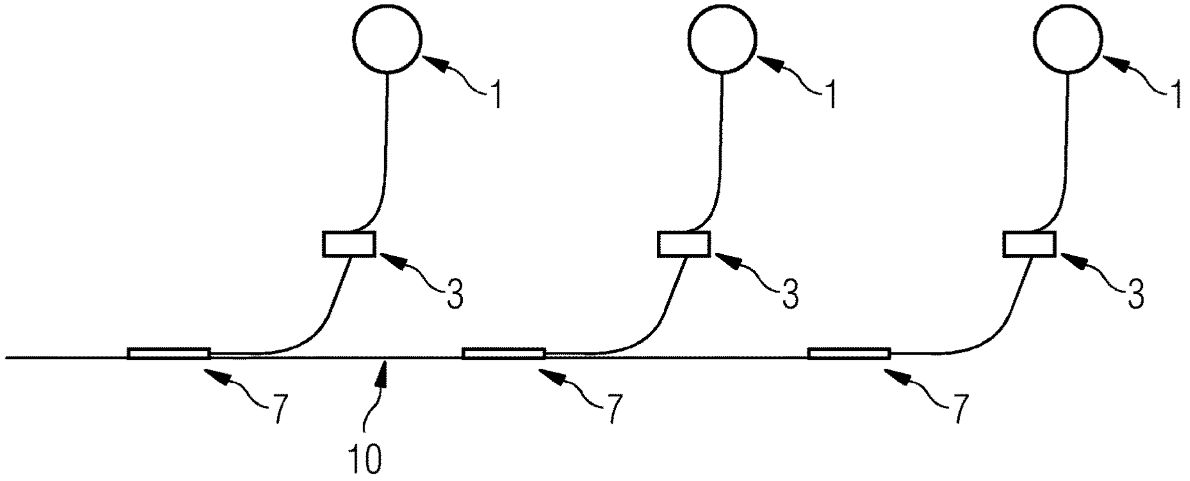

FIG. 1*b* is an illustration of an alternative subsea power grid, showing a system where power 1 is supplied, for example power generated by offshore wind turbines and consumed by loads 7, by connecting the generated power to a power cable which goes through a suitable transformer 3 to modules on the seabed by which the power from the wind turbine is connected to an export power cable 10 on the seabed. That export may be a connection to the shore, or to local loads.

The present invention addresses the problem of maintaining or restoring integrity of a subsea cable, for example for a subsea power grid, or transmission lines from an offshore windfarm or other power generation source. Typically, the cables used in such subsea systems are medium or high voltage subsea cables. Subsea cables may be at risk of damage, for example from external causes, such as anchors dragging, or impact from heavy objects, may be damaged by emergency intervention addressing other problems, or may fail at the end of their lifetime. In any of these cases, it is desirable to be able to restore integrity to the medium or high voltage subsea cable after a failure, external incident or an emergency intervention has compromised the integrity.

Conventionally, this problem has been addressed in a number of different ways. For electrical equipment installed on the seabed with regular service intervals, the equipment is connected to the medium or high voltage subsea cable through a permanent mate or de-mate solution for retrieval and re-installation of the electrical equipment. This allows for replacement of the cable in the event of damage. For electrical equipment installed on the seabed, which does not have planned service intervals, some, but not all, may be connected to the medium or high voltage subsea cable through a permanent mate or de-mate solution for retrieval and re-installation.

However, where the electrical equipment that is installed on the seabed with no planned service interval is directly connected to the medium or high voltage subsea cable and not provided with a permanent mate or de-mate solution, then the equipment must be retrieved in the event of a failure of the cable, or damage caused by external incidents to the cable or to the electrical equipment. Retrieval of the equipment in question may take place whilst still connected to the medium or high voltage subsea cable, in which case, the retrieved cable length is greater than, or equal to, the water depth at the installed location. Alternatively, the integrity of the medium or high voltage subsea cable may be broken before the electrical equipment is retrieved, so the equipment can be retrieved independently of the medium or high voltage cable. To reinstall the equipment on the seabed, it is necessary to use two field repair splices and a contingency length of medium or high voltage subsea cable. The length of the contingency cable is greater than, or equal to, twice the water depth at the installed location.

If the issue is due to a failure in the subsea cable, or due to an external incident causing damage to the medium or high voltage subsea cables, then typically it is necessary to break the integrity of the medium or high voltage subsea cable before retrieving each end of the cable separately. The cable is repaired topside, using two field repair splices and a contingency length of medium or high voltage subsea cable, which has a length that is greater than, or equal to, twice the water depth at the installed location.

Figure 2:
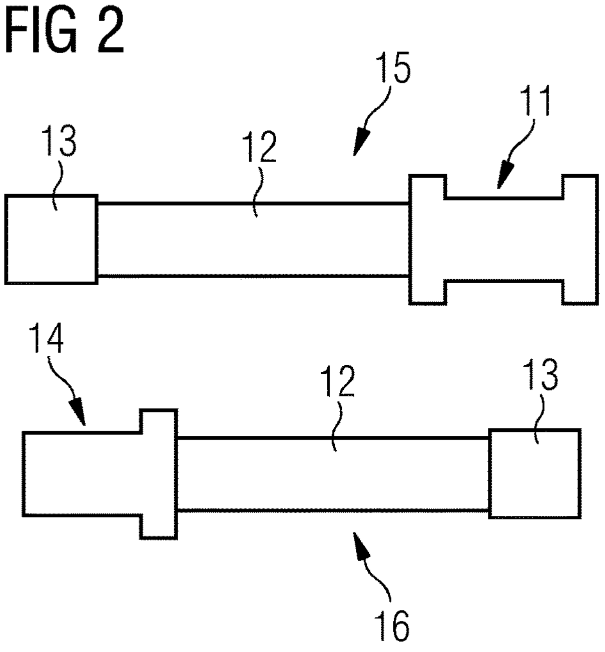
FIG. 2 illustrates an example of the subsystems for use in the system of the present invention.
Figure 3:
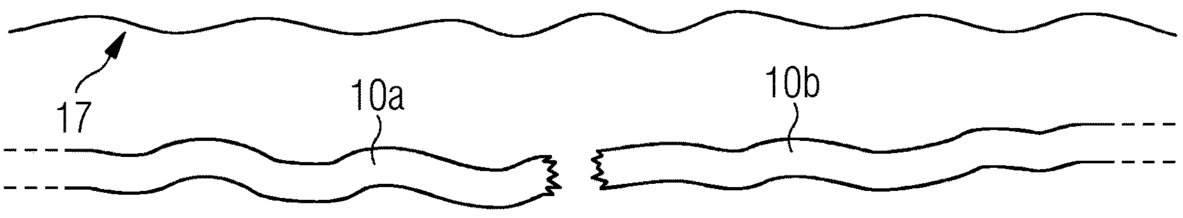
FIG. 3 illustrates a first step in an example of how the system of the present invention may be operated.
Figure 4:
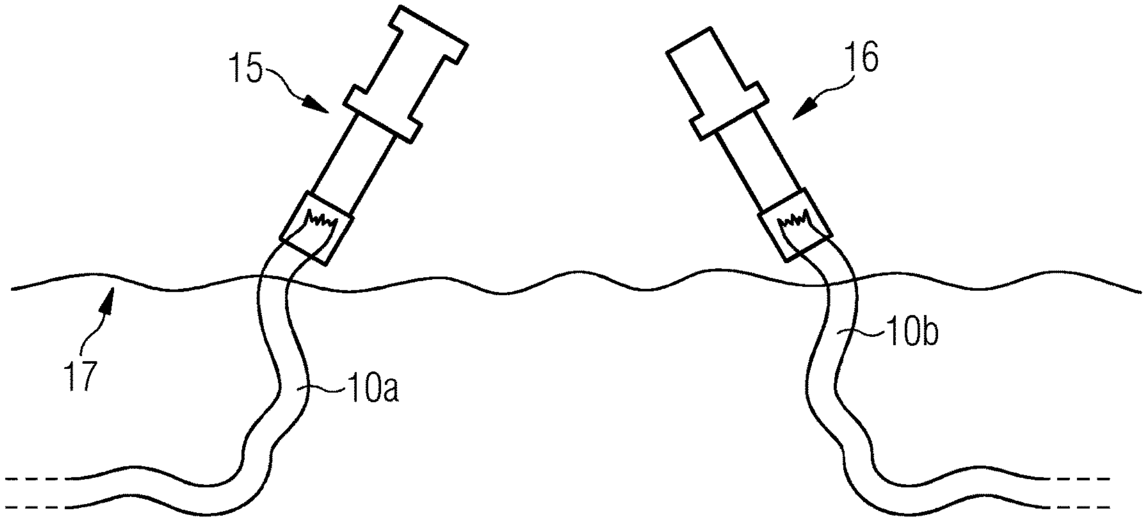
FIG. 4 illustrates a second step in an example of how the system of the present invention may be operated.

The present invention addresses these problems by means of a system comprising a wet mate connector arrangement having two sub-systems, for example as illustrated in FIG. 2. The first of these subsystems comprises a first, female, wet mate connector part, or receptacle 11, an oil filled hose 12 and a cable termination 13. For the example of a cable in the form of an umbilical, the termination is referred to herein as an umbilical termination, but is not limited to the cable only being an umbilical, but includes jumpers, or other subsea cables. The second subsystem comprises a second, male, wet mate connector part, or plug 14, an oil filled hose 12 and an umbilical termination 13. When a fault occurs in a subsea cable, or the subsea cable suffers external damage that needs to be repaired, for example, as illustrated in FIG. 3, then the integrity of the medium or high voltage subsea cable is broken at its location below the sea 17 before retrieving each end 10*a*, 10*b* of the cable separately to a topside location, such as a vessel, or platform. Once the cable ends are topside, i.e. above the surface of the sea 17, as illustrated in FIG. 4, the first subsystem 15 is the terminated and fixed to one cable end 10*a* after which the cable with its subsystem attached is returned to the seabed. Similarly, the second subsystem 16 is terminated and fixed to the other cable end 10*b*, after which that part of the cable with its subsystem is returned to the seabed.

An alternative is to retrieve each end of the cable 10*a*, 10*b* to a location subsea, such as a diving chamber, a submersible, or other controlled area subsea which can be made dry to allow work on the ends to do the termination first and second subsystems 15, 16. In that case, the termination shown in FIG. 4 is carried out subsea and the distinction of above and below the surface of the water 17, becomes within or outside a dry chamber subsea. This would be beneficial in cases where there were difficulties in having sufficient cable length to get the ends topside, without taking a lot more of the subsea infrastructure apart.

Figure 5:
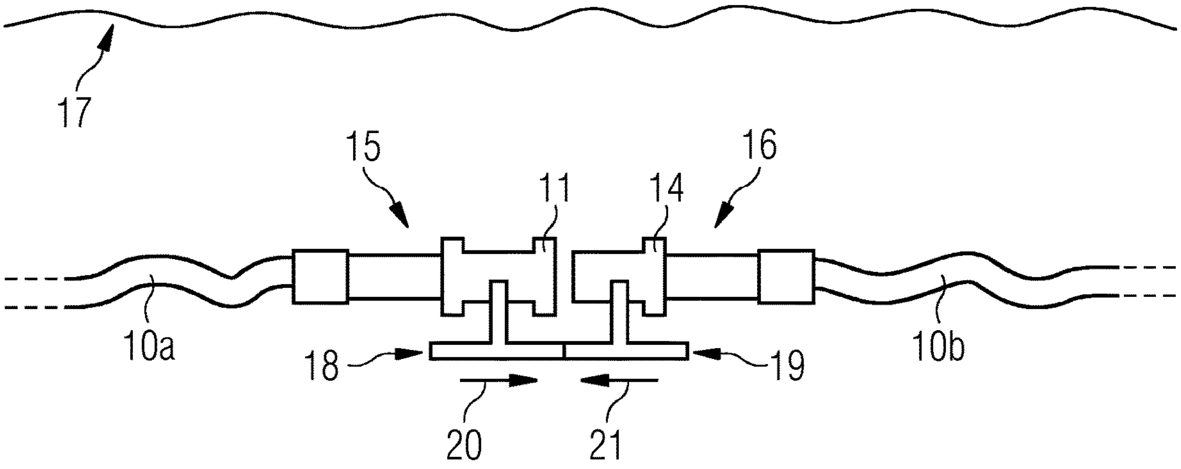
FIG. 5 illustrates a third step in an example of how the system of the present invention may be operated; and, FIG. 6 is a flow diagram of a method of restoring integrity to a subsea cable using a system according to the present invention.

Having carried out the termination, either topside, or in a dry chamber subsea, then the wet mate connectors are mated subsea, as illustrated in FIG. 5. A temporary, i.e. removable, typically reusable, stroking tool may then be placed on the seabed, below the surface 17 of the sea. The stroking tool may comprise two fixing mechanisms 18, 19, each one individually holding the first and second subsystems. The cable ends may be placed in first and second fixings of a stroking tool and the stroking tool then actuated to bring the female and male connector parts together. The female and male wet mate connector parts 11, 14 in the first and second subsystems 15, 16 are aligned, so that they face each other directly, in the fixing mechanisms. The stroking tool 18, 19 brings each of the wet mate connectors in the first and second subsystems 15, 16 towards the other, in the directions of the arrows 20, 21 and applies a suitable force to mate the two halves.

The stroking mechanism may be actuated in various ways, such as, by locally stored hydraulic power, by electrical energy, or by using an actuator tool on a remotely operated vehicle (ROV). The effect of successfully mating the two connector halves 11, 14 of the first and second subsystems is that the integrity of the medium or high voltage cable 10*a*, 10*b* has been restored. Mating the wet mate connectors restores the integrity of the subsea cable, without the need for a long contingency cable that can reach the seabed. The restored medium or high voltage cable may be retrieved from the fixing mechanisms 18, 19 of the stroking tool and placed on the seabed or into, or onto, a dedicated long term storage mounting (not shown). The connected cable is then removed from the stroking tool fixings and the stroking tool can be retrieved to the surface, to a subsea chamber; or to another subsea cable failure point.

Figure 6:
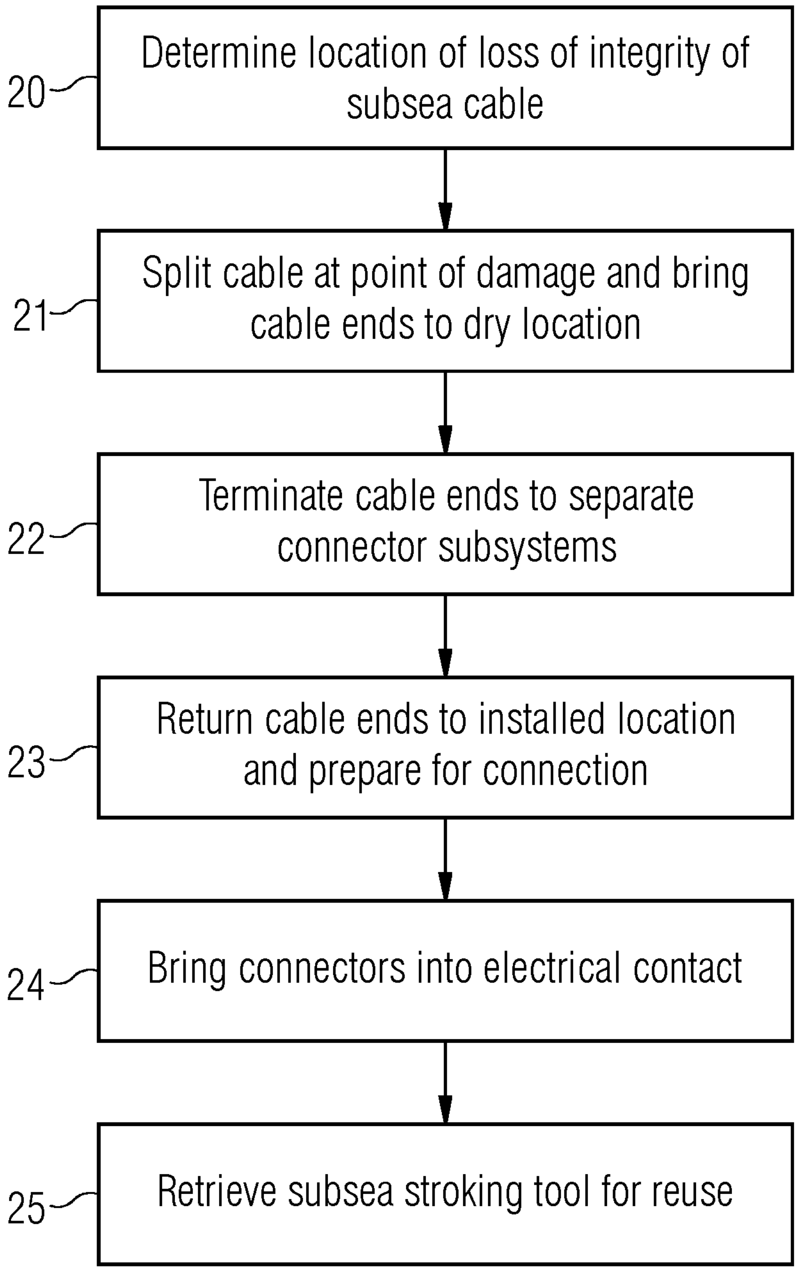

FIG. 6 illustrates the steps of a method of addressing loss of integrity of a subsea cable, such as a subsea medium or high voltage cable. The method comprises determining 20 a location of a fault or failure in a subsea cable which indicates that a loss of integrity of the cable has occurred. This may be part of continuous condition monitoring of the subsea cable or associated equipment, for example in response to an alert, or may be carried out at predetermined intervals. This step may be done at a quite different time to the actual repairs, as the subsequent steps rely on having the correct resources on site.

Having identified the location, the cable is separated at the point of failure, subsea, to form first and second cable ends. For example, an ROV or diver may be sent to split 21 the cable at the point where it has been damaged and retrieve the first and second cable ends to a dry location. This may involve bringing the two ends separately to a topside vessel or platform, or to some other location subsea that is able to handle the cable ends in a dry environment to enable the next steps to be carried out. Each of the cable ends is separately terminated 22 to an umbilical termination 13 of a first subsystem comprising a receptacle, or female, wet mate connector part and a second subsystem comprising a plug, or male, wet mate connector part, an oil filled hose and a cable termination. Whatever location is chosen for carrying out the termination, the terminations themselves are advantageously chosen to be quick and easy to fit, for example, using pre-moulded features, as topside may amount to a vessel in rough waters and subsea chambers have a high cost per hour associated with them, so making the termination process as efficient as possible is important. The umbilical terminations 13 are connected to the connector parts by a length of oil filled hose, which may be less than 10 m, e.g. 0.5 m to 5 m. Where the equipment is being dropped from topside, the length may be as much as 30 m to 60 m, depending on the ability to drop the equipment sufficiently accurately.

In the meantime, a subsea stroking tool, which may be both removable and reusable is installed at that location to receive the newly terminated cable ends when they are returned to the seabed, so that the female and male wet mate connectors can be mated. Having terminated each of the split cable ends to its umbilical termination 13, the complete arrangement of cable 10*a*, 10*b* and subsystem 15, 16 is returned 23 to the subsea location from which it was extracted, typically close to the seabed, or on a subsea mounting of some type and fitted to fixings of the subsea stroking tool. The male and female connector parts are arranged in the fixings, such that they face each other. The cable ends may be placed in first and second fixings of a stroking tool and, thereafter, the stroking tool may be actuated to bring the female and male connector parts together. An actuator of some type may be used to bring 24 the connector parts into contact and mate them, restoring the electrical integrity of the subsea cable. Examples of actuators include a hydraulic actuator, an electrical actuator, or a mechanical arm. The connected cable is then taken out of the fixings and set down on the seabed or mount in its operational location. The connected cable may be removed from the stroking tool fixings and the stroking tool retrieved 25 to the surface, to a subsea chamber, or to another subsea cable failure point. The subsea stroking tool is then available to use on a different repair.

Although the invention may require the use of a diver or ROV to manipulate the stroking tool underwater work, or carry out monitoring of the stroking operation, even if this is otherwise automated, as well as a surface vessel to work with the diver or ROV or use its own equipment to raise the damaged cable, the amount of contingency cable required to be kept in case of a repair and used to restore the cable integrity is significantly reduced. As a surface vessel, or platform of some type is required to retrieve the cable for repair, even with the conventional methods, then cost savings are achieved by doing away with the long contingency cable and field repair splices. Capital expenditure for sourcing permanent mate, or de-mate, tools is avoided, so deferring capital expenditure from project start-up to operational expenditure in the event of a failure, external event or emergency intervention. Wet mate connectors simplify the operations and reduce operational time, resulting in lower indirect operational expenditure and reduced loss of production.

It should be noted that the term "comprising" does not exclude other elements or steps and "a" or "an" does not exclude a plurality. Elements described in association with different embodiments may be combined. It should also be noted that reference signs in the claims should not be construed as limiting the scope of the claims. Although the invention is illustrated and described in detail by the preferred embodiments, the invention is not limited by the examples disclosed, and other variations can be derived therefrom by a person skilled in the art without departing from the scope of the invention.

The invention claimed is:

1. A subsea cable repair system comprising a first wet mate connector part and a second wet mate connector part, wherein the first and second wet mate connector parts comprise a receptacle and a plug; separate lengths of oil filled hose attached to one end of each of the first and second connector parts; a cable termination attached to the other end of each of the lengths of oil filled hose, and wherein a connection axis extends from a center of each cable termination, through the oil filled hosed attached thereto, and through the respective first connector part and the second connector part, the connection axis being parallel to the connection direction; and a removable, reusable, subsea stroking tool operable to move the first wet mate connector part and the second wet mate connector part along the connection axis and parallel to the connection direction to connect the receptacle and the plug together.

2. The system according to claim 1, wherein the lengths of oil filled hose are less than or equal to 60 metres.

3. The system according to claim 1, wherein the cable termination comprises a pre-moulded fitting.

4. The system according to claim 1, wherein the stroking tool comprises a pair of fixing mounts, one for each connector part and an actuator, to bring the connector parts together subsea.

5. The system according to claim 4, wherein the actuator comprises a hydraulic actuator, an electrical actuator, or a mechanical arm.

* * * * *